Jan. 12, 1960 M. V. KIEBERT, JR 2,921,266
SELF-BALANCING AMPLIFIER
Filed Feb. 14, 1955
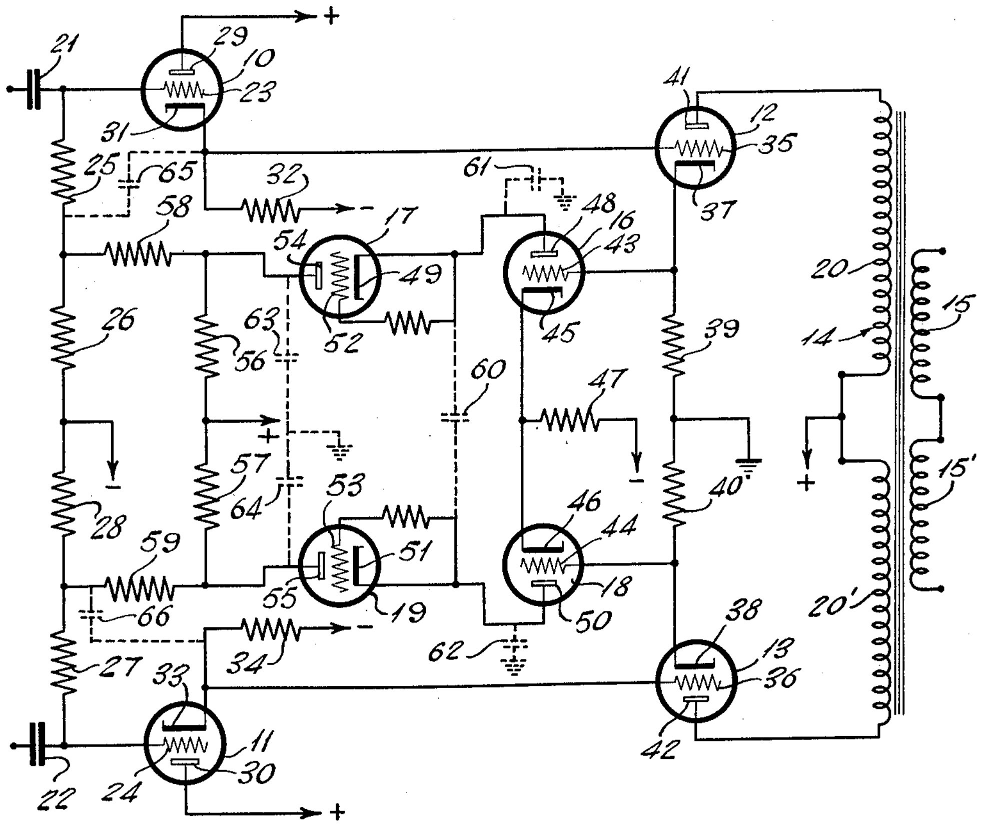
INVENTOR
MARTIN V. KIEBERT JR.
BY Eugene E. Geoffrey Jr.
ATTORNEY United States Patent Office 2,921,266

Patented Jan. 12, 1960

2,921,266

SELF-BALANCING AMPLIFIER

Martin V. Kiebert, Jr., Pomona, Calif.

Application February 14, 1955, Serial No. 487,890

5 Claims. (Cl. 330—119)

This invention relates to electronic amplifying systems and more specifically concerns an improved method and circuit for driving two or more vacuum tubes in push-pull wherein the driven tubes are maintained in a statically balanced condition and the class of operation may be modified in accordance with the signal level impressed on the tubes.

While this improved system is generally useful in all types of amplifying equipment it is particularly important in audio amplifiers for driving a push-pull output stage having transformer coupling in the output circuit. It is well recognized that electronic vacuum tubes of any given type vary in operating characteristics one from the others and in addition are further subject to changes during their life. Differences in the characteristics of tubes operated in push-pull result in differences in their plate currents which when fed through oppositely phased balanced windings of an output transformer will produce a D.C. saturating field in the transformer proportional to the difference between them that adversely affects the operation of the amplifier.

Transformer saturation is normally overcome by the use of adjustable resistors in the output stage to independently vary the grid bias on each tube and thus enable equalization of the plate currents. This procedure obviously does not take into consideration changes in tube characteristics with age and therefore in order to be assured of high fidelity response at all times it is essential that the plate currents in the output tubes be frequently checked and readjusted. While this can be accomplished by one skilled in the art it is not at all satisfactory for commercial equipment intended for use by the laymen. Accordingly it is one object of the invention to provide means for automatically balancing the output tubes of an amplifier to maintain their static plate currents substantially equal at all times. In this way transformer saturation is held at a minimum and a balanced dynamic signal is produced.

Another object of the invention is a self-balancing driving and output circuit for a push-pull amplifier that is characterized by its simplicity, dependability and relatively low cost. While additional amplifying and rectifying elements are used to attain this self-balancing feature the circuit eliminates expensive and critical components and may be quickly and easily adjusted for the desired operation.

A still further object of the invention resides in the provision of a self-balancing output stage for amplifiers together with a push-pull driving stage therefor wherein the self-balancing circuit will provide in addition to excellent static balancing of the output tubes an automatic bias control for the output tubes so that maximum power output can be attained at all power levels. With this arrangement as the input signal to the driving stage is increased the bias on the output tubes is automatically increased to shift the class of operation of the output tubes, for example, from class A to class AB1, AB2, etc.

The above and other objects of the invention will become more apparent with reference to the following description and accompanying drawings forming part of this application and illustrating one embodiment of an amplifier in accordance with the invention.

Briefly, the amplifier illustrated in the drawings comprises a pair of driver tubes 10 and 11 connected as cathode followers and adapted to be operated in push-pull. The cathode of tube 10 is directly coupled to the grid of one output tube 12 while the cathode of the tube 11 is directly coupled to the grid of the output tube 13. The plate circuit of the output tubes 12 and 13 includes a push-pull transformer 14 adapted to feed a load connected to the secondary windings 15 and 15'. The automatic balancing features includes a triode 16 and tube 17 connected between the output tube 12 and the cathode follower driver 10 and a second triode 18 and tube 19 interconnecting the cathode of the output tube 13 with the grid of the cathode driver follower 11. By proper selection of the components interconnecting the several tubes the plate currents of tubes 12 and 13 which are drawn through the primary windings 20 and 20' of the transformer winding 14 can be maintained in good static balance. This is accomplished through direct coupling of the components so that the D.C. voltage applied to the grids of the output tubes can be controlled by means of the feed back system. Furthermore the values of the various resistors and the characteristics of the tubes in the feed back circuit can be selected so that in addition to static balance, automatic bias control can be effected to gradually increase the negative bias applied to the grids of the ouput tubes as the signal applied to the tubes 10 and 11 is increased.

More specifically a push-pull input signal is applied to the tubes 10 and 11' through blocking condensers 21 and 22, respectively, connected to the grids 23 and 24 of the tubes 10 and 11. The grid return circuit for the grid 23 of tube 10 includes series connected resistors 25 and 26 and a source of negative potential. The grid 24 of tube 11 is similarly connected to a source of negative potential through series connected resistors 27 and 28. The plates 29 and 30 of tubes 10 and 11 are connected directly to a source of positive potential while the cathode 31 of tube 10 is connected to a negative supply through the cathode resistor 32. The cathode 33 of tube 11 is connected to a source of negative voltage through its cathode resistor 34.

The output signal from the cathode follower driver 10 is attained from the cathode 31 and fed directly to the grid 35 of the output tube 12. Similarly the cathode 33 of the driver tube 11 is connected to the grid 36 of the output tube 13. Cathodes 37 and 38 of the tubes 12 and 13 are connected to ground through relative low value sampling resistors 39 and 40, respectively, that may be of the order of five ohms depending upon the magnitude of the plate currents in the output tubes. The plates of the output tubes 41 and 42 are fed through the reversely phased primary windings 20 and 20' of the output transformer 14 which are in turn connected to a source of positive potential. It will be observed thus far that by properly biasing the tubes 10, 11, 12 and 13 that they will perform a normal amplifying function. For instance, the positive and negative supply voltages applied to the cathode driver follower 10 must be proportioned so that the cathode 31 of that tube is at a negative potential of the order required for the desired type of operation to be obtained from the output tube 12. In this connection the value of resistor 39 may need to be taken into consideration as it will have some effect on the potential of the cathode 37 since the bias or negative voltage applied to the grid is measured with respect to the cathode of the tube. The same requirements apply to the other half of this balanced amplifier involving tubes 11 and 13.

Referring now to the self-balancing feedback circuits involving tubes 16 through 19, the grid 43 of the tube 16 is directly coupled to the cathode 37 of the tube 12 while the grid 44 of the tube 18 is connected directly to the cathode 38 of the tube 13. The cathodes 45 and 46 of the tubes 16 and 18 are coupled together and connected to a negative supply voltage through a common cathode resistor 47. The plate 48 of the tube 16 is connected to the cathode 49 of the tube 17 while the plate 50 of the tube 18 is connected to the cathode 51 of tube 19. The tubes 17 and 19 are connected as cascode D.C. amplifiers with the grids 52 and 53, respectively, being connected through suitable resistors to the cathodes 49 and 51. If desired these grids 52 and 53 may be returned directly to a source of positive potential.

The plates or anodes 54 and 55 of the tubes 17 and 19 are connected through plate resistors 56 and 57, respectively, to a source of positive potential. In addition the plate 54 of tube 17 is connected through resistor 58 through the junction of grid resistors 25 and 26 of tube 10 and the plate 55 of tube 19 is connected through a resistor 59 to the junction of resistors 27 and 28 in the grid circuit of tube 11.

Considering the upper half of the feed back circuit involving tubes 16 and 17, the tube 17 functions in cooperation with the triode 16 to provide added gain in the feedback circuit without encountering phase reversal. The gain of tube 16 is approximately $$\frac{uR_L}{R_L - R_P}$$

where $u$ is the amplification factor, $R_L$ is the load impedance on the tube, and $R_P$ is the internal plate resistance of the tube.

The gain of the feedback circuit with the cascode amplifier tube 17 in the plate circuit of tube 16 is $$\frac{u^2R_L}{R_L + R_P}$$

While the filament circuits have been omitted from this figure for simplicity the tubes are of course provided with suitable filaments for heating the cathodes in accordance with conventional practice. While the tubes 12 and 13 are illustrated as indirectly heated tubes they may of course be filament type tubes with separate voltage supplies for each tube. In addition two or more output tubes 12 and 13 may be employed in cases requiring additional power output.

With the circuit as described above, and with no input applied to the grids of the driver tubes 10 and 11, the current through the cathode resistors 32 and 34 will determine the bias on the grids of the output tubes 12 and 13. The current in the plate circuits of these output tubes will be a function of this bias voltage and the potential of the cathodes 37 and 38 of the output tubes. Now assuming that the output tubes 12 and 13 are unbalanced with the tube 12 drawing more current than tube 13. This will cause the cathode 37 to assume a positive potential higher than that of the cathode 38. Since the plate current of tube 16 varies with the potential of cathode 37 it will draw more plate current through the tube 17 and plate resistor 56. The reduction of the potential at the plate 54 of tube 17 decreases the current through grid resistor 26 with the result that the grid 23 of tube 10 becomes more negative. The current through the cathode resistor 32 of tube 10 is thereby decreased, the cathode 31 of tube 10 and grid 35 of tube 12 become more negative and the plate current of tube 12 is decreased.

Simultaneously with the foregoing action the plate current of the output tube 13 is increased through the action of the common cathode resistor 47 for the tubes 16 and 18. Thus under a condition where the tube 16 draws more current both cathodes 45 and 46 become more positive and effectively increases the negative bias on grid 44 of the tube 18 so that the grid 36 of output tube 13 will become more positive and cause the tube 13 to draw more plate current. In this way automatic static balance is attained.

In certain cases it may be necessary to prevent undesirable degeneration or feedback of the signal voltage through the feedback circuits and in addition prevent the balancing procedure from functioning too rapidly. To increase the time constant of the circuit a condenser 60 may be connected between the plates 48 and 50 of tubes 16 and 18 as illustrated in dotted outline. This condenser will also serve to prevent degeneration and its action may be supplemented by condensers 61, 62, 63 and 64 connected from the plates of tubes 16 to 19 to ground, respectively. Increased input impedance to the tubes 10 and 11 can be attained by the utilization of condensers 65 and 66 connected between the cathode and grid circuits of those tubes.

As previously pointed out, the feedback circuits of this amplifier can be operated to modify the class of operation of the output tubes 12 and 13. In this case the circuit elements would be adjusted so that the feedback signal from the cathodes of the output tubes to the grids of the driver tubes would vary so that the grids of the output tubes would become more and more negative as the signal is increased and thus maintain output tube operation at all times along the straight portion of the grid voltage plate current curve.

It is significant to note that with the condensers 60 to 66 omitted, the time constant of the feedback circuit is very small and only static balancing is obtained. With the condensers as described above dynamic control of the bias of the output tubes is obtained since the long time constant will sustain the feedback voltages. Furthermore the required D.C. component amplified by the feedback circuit to attain a change in bias results from the rectification produced by the output tubes themselves since in push-pull operation the plate current variations of each tube are not symmetrical about a central value and therefore the differences between the positive and negative changes in plate current results in a D.C. component proportional to the asymmetrical nature of these variations.

While only one embodiment of the invention has been illustrated and described it is apparent that modifications, alterations and changes may be made without departing from the true scope and spirit thereof.

What is claimed is:

1. In an amplifier having a pair of driver tubes each directly coupled with one of a pair of output tubes connected in pushpull for the transmission of direct current and alternating current signals, said output tubes each having a control electrode and means for biasing said electrode, feedback means including at least two direct current amplifiers each connected with one of said driver tubes and responsive to the biasing means of the associated output tube to modify the operating characteristics of the last said driver tube and control the bias on the control electrode of the output tube coupled to the last said driver tube and a biasing impedance in circuit with both of said direct current amplifiers so that an increase in a signal produced by one direct current amplifier will result in a decrease in the corresponding signal produced by the other amplifiers.

2. An amplifier comprising a pair of amplifying devices each connected as a cathode follower and having at least three electrodes including a control electrode, at least two output amplifying devices connected in push pull and each having at least three electrodes including a control electrode, individual means self-biasing each of said output devices, direct coupling between each cathode follower amplifier and the control electrode of one of said output tubes, at least two direct current amplifying devices each having a control electrode connected with one of said self-biasing means, a biasing impedance common to both of the last said devices for biasing the control electrodes thereof, and connections between each of said cathode follower amplifiers and one of said direct current amplifiers to modify the operation of said cathode follower amplifying devices and the bias on said control electrodes of said output devices in accordance with changes in the self-bias of each of said output devices.

3. An amplifier comprising at least two cathode follower connected driver tubes each having a plate, cathode and control grid adapted to be operated in push-pull, an output stage having at least two tubes each including a plate, cathode and control electrode connected for push-pull operation, direct current coupling between the cathodes of each of said driver tubes and control electrodes of said output tubes, a direct current amplifier interconnecting the cathode of each output tube with the grid of its associated driver tube and electrical means interconnecting the last said direct current amplifiers to produce an increased signal in one amplifier when the signal in the other is decreased, whereby a change in cathode current of one output tube in one direction will function through its associated direct current amplifier and driver tube to effect a change in potential of its grid and thereby change its cathode current in the other direction and simultaneously reflect corresponding changes of reverse direction in the direct current amplifier and driver tube associated with the other output tube and cathode current of the last said output tube.

4. An amplifier according to claim 3 wherein each direct current amplifier includes at least one amplifying device having a plate, grid and cathode and a rectifier interconnected therewith and said electrical means comprises an impedance to common to the cathodes of both direct current amplifying devices.

5. An amplifier comprising a pair of vacuum tubes each connected as a cathode follower and having a cathode, plate and at least one grid, at least two output tubes each having a cathode, plate and at least one grid, means coupling the plates of the output tubes in push-pull, separate impedance in circuit with each output tube cathode, a direct connection between the cathode of each cathode follower and the grid of one of said output tubes, at least two direct current amplifier tubes each having a plate, cathode and at least one grid, a connection between the grid of each direct current amplifier and the cathode of one of said output tubes, an impedance in series with the cathodes of both direct current amplifiers, at least two cascode amplifiers each in series with the plate of one of said direct current amplifiers and impedance means coupling each cascode amplifier to the grid of one of said cathode followers, whereby an increase in the cathode potential of one output tube will change the cathode potential of the associated cathode follower and the grid of the last said output tube to reduce cathode potential thereof and at the same time produce a reverse reaction in the other output tube to cause its cathode potential to decrease.

References Cited in the file of this patent

UNITED STATES PATENTS

| | | |
|---|---|---|
| 2,273,997 | Rubin | Feb. 24, 1942 |
| 2,361,889 | Walsh | Oct. 31, 1944 |
| 2,369,066 | Maxwell | Feb. 6, 1945 |
| 2,529,459 | Pourciau | Nov. 7, 1950 |
| 2,554,279 | Tharp | May 22, 1951 |
| 2,716,162 | Pearlman | Aug. 23, 1955 |

OTHER REFERENCES

Radio Electronics, July 1953; pages 28–30, Joseph Marshall, "Importance of Balance in Push-Pull Amplifiers."